(12) United States Patent
Kim

(10) Patent No.: US 12,124,988 B2
(45) Date of Patent: Oct. 22, 2024

(54) AVERAGE WEIGHT CALCULATION AND SHIPMENT MANAGEMENT SYSTEM OF EDIBLE POULTRY, AND SHIPMENT MANAGEMENT METHOD USING THE SAME

(71) Applicant: E-MOTION Co., Ltd., Jeonju-si (KR)

(72) Inventor: Hocheol Kim, Jeonju-si (KR)

(73) Assignee: E-MOTION CO., LTD., Jeonju-si (KR)

( * ) Notice: Subject to any disclaimer, the term of this patent is extended or adjusted under 35 U.S.C. 154(b) by 974 days.

(21) Appl. No.: 16/975,676

(22) PCT Filed: Nov. 16, 2018

(86) PCT No.: PCT/KR2018/014044
§ 371 (c)(1),
(2) Date: Aug. 25, 2020

(87) PCT Pub. No.: WO2020/101076
PCT Pub. Date: May 22, 2020

(65) Prior Publication Data
US 2020/0410437 A1    Dec. 31, 2020

(30) Foreign Application Priority Data
Nov. 14, 2018 (KR) .................. 10-2018-0140073

(51) Int. Cl.
*G06Q 10/0832* (2023.01)
*G01G 17/08* (2006.01)
(Continued)

(52) U.S. Cl.
CPC ......... *G06Q 10/0832* (2013.01); *G01G 17/08* (2013.01); *G06F 18/2321* (2023.01); *G06Q 10/04* (2013.01); *G06Q 10/0833* (2013.01)

(58) Field of Classification Search
CPC .............. G06Q 10/0832; G06Q 10/04; G06Q 10/0833; G06F 18/2321; G01G 17/08
See application file for complete search history.

(56) References Cited

U.S. PATENT DOCUMENTS

| | | | |
|---|---|---|---|
| 10,064,390 B1* | 9/2018 | Landers | A01K 15/021 |
| 2005/0006153 A1* | 1/2005 | Baarsch | G01G 17/08 |
| | | | 177/25.13 |
| 2005/0217589 A1* | 10/2005 | Daniel | A01K 1/0029 |
| | | | 119/51.02 |

FOREIGN PATENT DOCUMENTS

| | | |
|---|---|---|
| JP | 2014-163864 A | 9/2014 |
| KR | 10-1998-0035117 A | 8/1998 |

(Continued)

OTHER PUBLICATIONS

"KNN-kernel density-based clustering for high-dimensional multivariate data", Thanh N. Tran, Computational Statistics & Data Analysis, vol. 51, Issue 2, Nov. 15, 2006 (Year: 2006).*

*Primary Examiner* — Tien Q Dinh
*Assistant Examiner* — Katherine June Bolek
(74) *Attorney, Agent, or Firm* — Bridgeway IP Law Group, PLLC; Sang Ho Lee; Hyun Woo Shin

(57) ABSTRACT

An average weight calculation and shipment management system of edible poultry includes: a weight measurement device that is installed in a poultry house and measures in real time a weight of edible poultry by using a load cell; a weight and shipment prediction server that receives weight data measured in real time from the weight measurement device, derives an average weight of the edible poultry, and predicts a shipping date by using the derived average weight; and a monitoring unit that is provided with the average weight and the predicted shipping date derived from the weight and shipment prediction server. The weight and shipment prediction server collects a large number of the (Continued)

weight data and densifies the large number of collected weight data to derive an average weight of the edible poultry, and predicts the shipping date by using the derived average weight.

12 Claims, 9 Drawing Sheets

(51) Int. Cl.
*G06F 18/2321* (2023.01)
*G06Q 10/04* (2023.01)
*G06Q 10/0833* (2023.01)

(56) References Cited

FOREIGN PATENT DOCUMENTS

| | | | |
|---|---|---|---|
| KR | 10-2017-0006887 A | 1/2017 | |
| KR | 10-2017-0031929 A | 3/2017 | |
| KR | 10-2017-0058521 A | 5/2017 | |
| KR | 10-1823082 B1 | 3/2018 | |
| KR | 10-1877271 B1 | 7/2018 | |
| WO | WO-2018118714 A1 * | 6/2018 | ........... A01K 11/006 |

\* cited by examiner

AVERAGE WEIGHT CALCULATION AND SHIPMENT MANAGEMENT SYSTEM OF EDIBLE POULTRY, AND SHIPMENT MANAGEMENT METHOD USING THE SAME

TECHNICAL FIELD

The present invention relates to an average weight calculation and shipment management system of edible poultry, and a shipment management method using the same, and more specifically, relates to an average weight measurement system of edible poultry using an average weight calculation algorithm of edible poultry, to which a data density estimation theory is applied, and shipment management through environmental control and monitoring in a poultry house.

BACKGROUND

A broiler chicken, which is an example of an edible poultry, includes chickens for chicken soup with ginseng and locally grown chickens.

In this case, broiler chickens are bred by using a flat-land chicken house, and approximately 30,000 chickens or more are bred in the chicken house.

In addition, the broiler chickens take about 35 days from adoption (chicken influx) to become adult chickens that can be shipped, and the management of the broiler chickens one week before the shipment is very important For example, in a case of broiler chickens, the chickens are shipped when the weight of the individual is in a range of about 1.35 kg to 1.60 kg. In this case, a sample individual weight of about 3% of chickens per one house (about 300 chickens on the basis of 10,000 chickens in one house) is measured, and the chickens are shipped only when the weight of the chicken reaches the above-described weight range.

Therefore, when the broiler chickens are bred, it is necessary to predict whether or not the chickens are infected by any disease by confirming a change in the weight of the chicken for each day-old group. On the other hand, in order for the chicken to grow healthily along a standard growth curve, amounts of feed and water supply must be appropriately adjusted according to the change in weight of the chicken.

In other words, when the chickens are bred, it is most important to take appropriate measures according to the change in weight of chickens to improve the productivity of the chickens by measuring the weight of chickens once a day.

In the related art, there is a method in which by using a scale configured to have a flat surface that is a load plate on which an object to be weighed is placed, one person holds the chicken with both hands and puts the chicken on the flat load plate, and then another person reads a gradation of the scale and records it when the chicken is weighed.

However, the gradation continuously fluctuates according to the movement of the chicken placed on the flat load plate, and thereby there is a problem that it is difficult to accurately measure the weight value. As another method, there is a method of measuring the weight of the chicken by using a scale provided in a funnel-shaped container after placing the chicken upside down in the container, but there is a problem that stress of the chicken is increased.

In addition, in a case where the chicken is weighed by using these scales of the related art, since a person who puts the live chicken on the scale and another person who reads and records the gradation of the scale must work together, there is an inconvenience that at least two or more operators have to work together.

In addition, when the chicken is weighed in the related art, the gradation displayed on the scale must be manually recorded by the operator, so that it takes too much time to measure the weight of hundreds or thousands of chickens every day. In most farms, it takes a lot of time and labor to measure the weight of the chicken, and the farms mostly rely on experienced farmers to manage a process of chicken growth.

Recently, as an imaging system has been developed, an image recognition method has been proposed in which the imaging system is installed in the chicken house to determine the weight of the chicken by a size of the chicken.

Such an image recognition method enables to measure the weight of the chicken without stressing the chicken, and there are advantages that it does not consume a lot of manpower and a large amount of weight data can be accumulated. However, there are disadvantages in that accurate measurement is difficult when the chicken moves, such as flapping of its wings, individual chickens may overlap with each other during measurement, and there is potential for distortion of a wide-angle lens of a camera, and delicate filtering is required to determine depths of feathers and skin. In addition, due to these disadvantages, there is a problem in that an error rate is large due to a large variation in weight depending on a measurement time point.

In the case of the broiler chicken, if the shipping date is delayed due to the weight, a farmhouse revenue decreases due to additional feed and an increase in chicken house management costs. If the chicken is shipped under a state of a low weight, the revenue decreases due to a reduced commercial value.

Therefore, it is urgent to introduce a system capable of environmental control, monitoring, and shipment management by measuring in real time biometric information (weight or the like) and environmental information (temperature, humidity, carbon dioxide, ammonia, or the like) on the edible poultry.

SUMMARY OF INVENTION

Technical Problem

An object of an embodiment of the present invention invented to solve the above problems is to provide an average weight measurement system of edible poultry using an algorithm for calculating an average weight of edible poultry to which data density estimation theory is applied, and a shipment management system through environmental control and monitoring of a poultry house.

Solution to Problem

An average weight calculation and shipment management system of edible poultry according to an example of the present invention to solve the above-described problems, the system includes: a weight measurement device that is installed in a poultry house and measures in real time a weight of edible poultry by using a load cell; a weight and shipment prediction server that receives weight data measured in real time from the weight measurement device, derives an average weight of the edible poultry, and predicts a shipping date by using the derived average weight; and a monitoring unit that is provided with the average weight and the predicted shipping date derived from the weight and shipment prediction server. The weight and shipment prediction server collects a large number of the weight data and densifies the large number of collected weight data to derive an average weight of the edible poultry, and predicts the shipping date by using the derived average weight.

In addition, the weight measurement device may include: a cell plate that accommodates the edible poultry; a cell moving pipe that supports the cell plate and moves up and down; a guide holder that guides the movement of the cell moving pipe; a cell control unit to which the guide holder and the cell moving pipe are connected, and which is provided with the load cell to measure the weight according to the downward movement of the cell moving pipe; and a cell support that is connected to the cell control unit, supports the cell plate, the cell moving pipe, the guide holder, and cell control unit, and is fixed to an inside of the poultry house.

In addition, the weight measurement device may further include a haptic motor on a lower surface of the cell plate, and prevent the edible poultry accommodated in the cell plate from continuously remaining due to the vibration of the haptic motor to derive the edible poultry to evenly rise on the cell plate.

In addition, the weight measurement device may further include: an environmental sensor provided on one side of the guide holder, and the environmental sensor may include one or more of a temperature and humidity sensor, a carbon dioxide sensor, and an ammonia sensor.

In addition, the weight and shipment prediction server may include: a data storage unit that collects and stores the weight data transmitted from the weight measurement device; and a data processing unit that densifies the weight data stored in the data storage unit to derive the average weight, and predicts the shipping date by using the derived average weight.

In addition, the data processing unit may pre-process the received weight data and accumulate the pre-processed weight data to generate a histogram according to a weight and a frequency, and be configured to generate the histogram by using the following Equation 1.

$$P_H(x) = \frac{1}{n} \times \frac{\text{Count}(x)}{\text{Width}(x)} = \frac{\text{Count}(x)}{nh} \quad \text{[Equation 1]}$$

(where, x is a weight, n is the number of collected weight data, h is a width value of a Gaussian filter, Count(x) is a frequency of x, and Width(x) is a size of a histogram bin).

In addition, the data processing unit may estimate a smooth density function by applying a kernel density estimation using a Gaussian filter to the generated histogram, derive an average weight through the estimated smooth density function, and estimate the smooth density function by using the following Equation 2.

$$P_{KDE}(x) = \frac{1}{Nh^D} \sum_{i=1}^{N} K\left(\frac{x - x^{(i)}}{h}\right) \quad \text{[Equation 2]}$$
$$= \frac{1}{N} \sum_{i=1}^{N} \frac{1}{(h\sqrt{2\pi})^D} \exp\left(-\frac{1}{2}\left(\frac{x - x^{(i)}}{h}\right)^2\right)$$

(where, x is a weight, $h^D$ is an amplitude=1, $P_{KDE}(x)$ is a smooth density function estimation result using the Gaussian filter (kernel) corresponding to x, k is a Gaussian kernel function, $x-x^{(i)}$ is a filter size to which the Gaussian filter is applied from filter sizes 1 to N based on x to be calculated, D is a parameter for reflecting a size of the histogram bin in defining a width of the Gaussian filter, and N is the Gaussian filter size defined as 49).

In addition, the data processing unit may predict the shipping date by deriving an expected average weight for a certain period of time in the future based on a differential value obtained by differentiating reference weight data for each day-old group, which is previously input.

In addition, the weight and shipment prediction server may further include: a data providing unit that provides a user with weight data, an estimated average weight, and a predicted shipping date of edible poultry from the weight and shipment prediction server. The data providing unit may map a large number of poultry houses based on the expected shipping date and provides the user with the mapped poultry houses.

In addition, the weight measurement device may further include a feed supply unit that is controlled by the cell control unit and automatically supply feed every set time, and the feed supply unit may attract the poultry to the weight measurement device.

In a shipment management method using an average weight calculation and shipment management system of edible poultry, the method includes: a step of collecting a large number of weight data of the edible poultry for a certain period of time through one or more weight measurement devices which are installed in a poultry house where the edible poultry are bred; a step of pre-processing the collected weight data; a step of accumulating a large number of pre-processed weight data and generating a histogram according to a weight and a frequency; a step of estimating a smooth density function with the generated histogram, and deriving an average weight through the estimated smooth density function; and a step of predicting a shipping date of the edible poultry by using the derived average weight.

In addition, the step of pre-processing the collected weight data may include: a step of setting an environment setting value; and a step of pre-processing the weight data by using the set environment setting value.

In addition, the step of generating the histogram may accumulate pre-processed weight data to generate the histogram according to the weight and the frequency, and the histogram may be generated by using the following Equation 1.

$$P_H(x) = \frac{1}{n} \times \frac{\text{Count}(x)}{\text{Width}(x)} = \frac{\text{Count}(x)}{nh} \quad \text{[Equation 1]}$$

(where, x is a weight, n is the number of collected weight data, h is a width value of a Gaussian filter, Count(x) is a frequency of x, and Width(x) is a size of a histogram bin).

In addition, the step of deriving the average weight may include a step of applying a kernel density estimation using a Gaussian filter to the generated histogram to estimate a smooth density function; and a step of deriving an average weight through the estimated smooth density function, and the smooth density function is estimated by using the following Equation 2.

$$P_{KDE}(x) = \frac{1}{Nh^D} \sum_{i=1}^{N} K\left(\frac{x - x^{(i)}}{h}\right) \quad \text{[Equation 2]}$$

-continued $$= \frac{1}{N}\sum_{i=1}^{N}\frac{1}{(h\sqrt{2\pi})^D}\exp\left(-\frac{1}{2}\left(\frac{x-x^{(i)}}{h}\right)^2\right)$$

(where, x is a weight, $h^D$ is an amplitude=1, $P_{KDE}(x)$ is a smooth density function estimation result using the Gaussian filter (kernel) corresponding to x, k is a Gaussian kernel function, $x-x^{(i)}$ is a filter size to which the Gaussian filter is applied from filter sizes 1 to N based on x to be calculated, D is a parameter for reflecting a size of the histogram bin in defining a width of the Gaussian filter, and N is the Gaussian filter size defined as 49).

In addition, the step of predicting the shipping date of the edible poultry may predict the shipping date by deriving an expected average weight for a certain period of time in the future based on a differential value obtained by differentiating reference weight data for each day-old group, which is previously input.

In addition, after the step of predicting the shipping date of the edible poultry, as a step of providing the predicted shipping date by storing the predicted shipping date and mapping, a step of providing the user with a large number of poultry houses by mapping the large number of poultry houses based on the predicted shipping date may further provided.

Advantageous Effects

In the average weight measurement system of edible poultry and shipment management according to the measurement in an example of the present invention, the average weight may be calculated by measuring in real time the weight of the edible poultry, thereby managing the shipping date.

In addition, the shipping date can be managed by monitoring a state of the edible poultry.

In addition, it is possible to provide a good breeding environment for edible poultry by controlling and monitoring the environment of the poultry house.

In addition, there is an advantage that the system can be applied to all poultry, and thereby the system can be widely used in a breeding system.

In addition, a poultry growth manual can be created through big data of bio-information and environmental information of the poultry.

In addition, high-quality edible poultry can be shipped, thereby providing the consumer with a product having high commerciality.

In addition, the cost of loss, labor, and feed costs can be reduced.

BEST MODE FOR INVENTION

Figure 1:
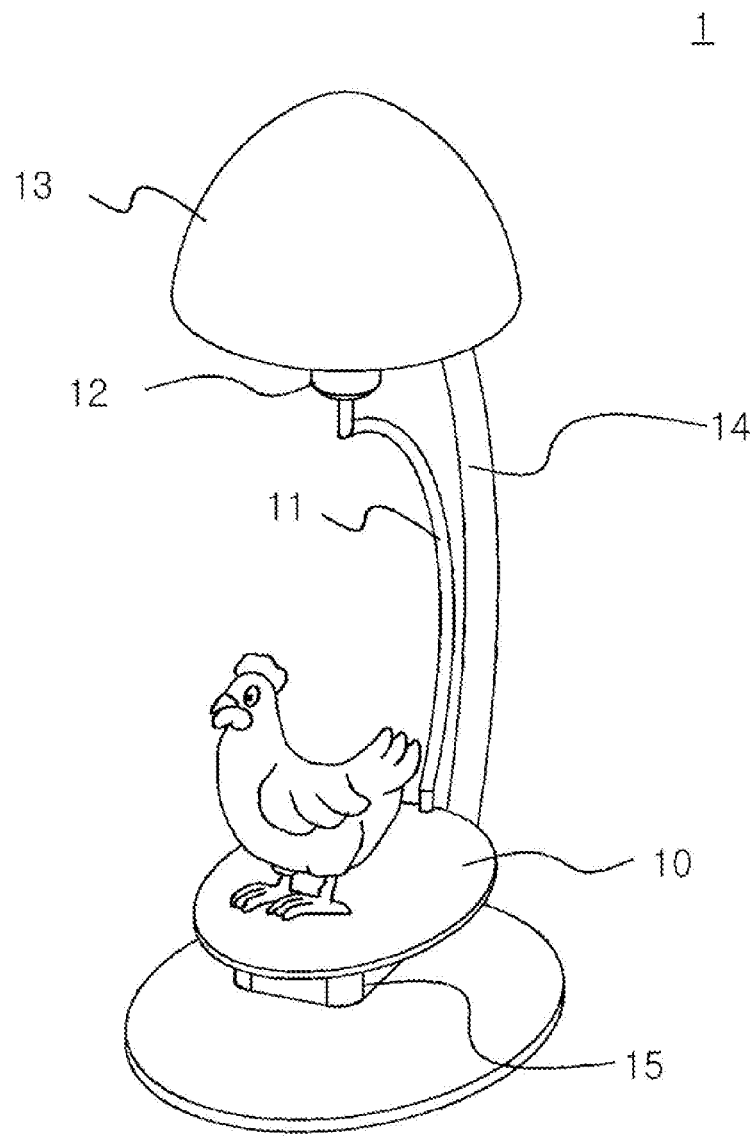
FIG. 1 is a perspective view illustrating a weight measurement device of an average weight calculation and shipment management system of edible poultry according to an example of the present invention.

In an average weight calculation and shipment management system of edible poultry, according to an example of the present invention, the system can be provided, which includes: a weight measurement device that is installed in a poultry house and measures in real time a weight of edible poultry by using a load cell; a weight and shipment prediction server that receives weight data measured in real time from the weight measurement device, derives an average weight of the edible poultry, and predicts a shipping date by using the derived average weight; and a monitoring unit that is provided with the average weight and the predicted shipping date derived from the weight and shipment prediction server. The weight and shipment prediction server collects a large number of weight data and densifies the large number of collected weight data to derive an average weight of the edible poultry, and predicts the shipping date by using the derived average weight.

On the other hand, in a shipment management method using an average weight calculation and shipment management system of edible poultry, the method can be provided, which includes: a step of collecting a large number of weight data of the edible poultry for a certain period of time through one or more weight measurement devices which are installed in a poultry house where the edible poultry are bred; a step of pre-processing the collected weight data; a step of accumulating a large number of pre-processed weight data and generating a histogram according to a weight and a frequency; a step of estimating a smooth density function with the generated histogram, and deriving an average weight through the estimated smooth density function; and a step of predicting a shipping date of the edible poultry by using the derived average weight.

Detailed Description of the Embodiments

Hereinafter, the description of the present invention with reference to the drawings is not limited to a specific embodiment, and various conversions can be applied and various examples can be provided. In addition, it should be understood that content described below include all transformations, equivalents, and substitutes included in the spirit and scope of the present invention.

In the following description, terms such as first and second are terms used to describe various components, and are not limited in meaning to themselves, and are used only to distinguish one component from other components.

The same reference numerals used throughout this specification denote the same components.

A singular expression used in the present invention includes plural expressions unless the context clearly indicates otherwise. In addition, terms such as "include", "provide" or "have" described below are intended to indicate that feature, number, step, operation, configuration element, component, or a combination thereof described in the specification exists. It should be interpreted and understood to not preclude the existence or addition possibility of one or more other features, numbers, steps, operations, configuration elements, components, or combinations thereof.

Hereinafter, examples of the present invention will be described in detail with reference to FIGS. 1 to 11.

The average weight calculation and shipment management system of edible poultry according to an example of the present invention can include a weight measurement device 1, a weight and shipment prediction server 2, and a monitoring unit 3.

The weight measurement device 1 is installed in the poultry house and measures in real time the weight of the edible poultry by using a load cell.

The weight measurement device 1 will be described later in detail.

The weight and shipment prediction server 2 can receive weight data measured in real time from the weight measurement device 1 of the present invention to derive the average weight of the edible poultry, and predicts the shipping date by using the derived average weight.

That is, it is possible to collect a large number of the weight data and densify the large number of collected weight data to derive the average weight of the edible poultry, and predict the shipping date by using the derived average weight.

The monitoring unit 3 can receive the average weight and the predicted shipping date from the weight and shipment prediction server 2.

In addition, by outputting data of the average weight calculation and shipment management system of the edible poultry or all processes which are processed by using the data, an operator who manages the poultry house or other related persons can output the data or all processes for easy identification.

In this case, the monitoring unit 3 can be a terminal provided in the poultry house, or a terminal such as a smartphone, a tablet PC, or a computer owned by a user who manages a large number of poultry houses.

Figure 2:
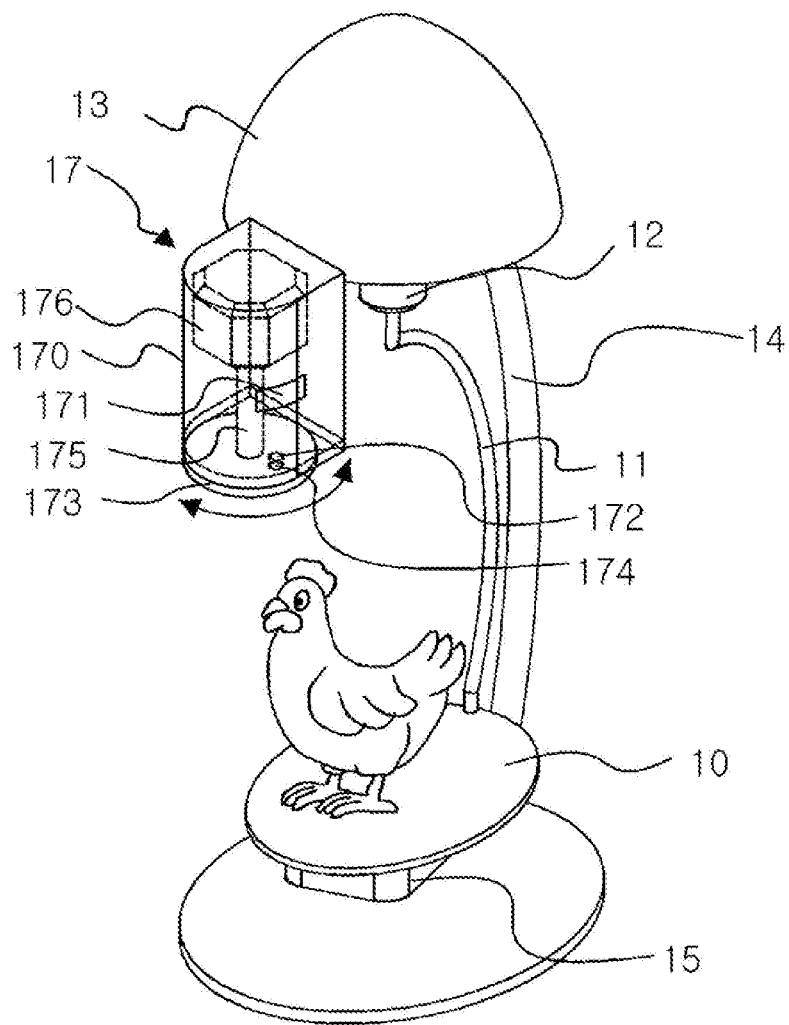
FIG. 2 is an exemplary view illustrating the weight measurement device in which a feed supply unit is further included according to an example of the present invention.

With reference to FIGS. 1 and 2, one or more weight measurement devices 1 of the average weight calculation and shipment management system of the edible poultry according to an example of the present invention is installed in each of a plurality of poultry houses, is formed by reflecting behavioral habits of the edible poultry, and can measure the weight of the edible poultry by using a load cell.

That is, a plurality of weight measurement devices 1 are installed in the poultry house, and an installation position thereof is determined by reflecting behavioral habits of the edible poultry, so that the edible poultry can step on the weight measurement devices by themselves, and the weight of the edible poultry can be measured in real time.

To this end, the weight measurement device 1 can include a cell plate 10, a cell moving pipe 11, a guide holder 12, a cell control unit 13, and a cell support 14.

Specifically, the cell plate 10 is a space for accommodating the edible poultry, and when the edible poultry steps on the cell plate 10 of the weight measurement device 1, the weight thereof can be measured.

In addition, the cell plate 10 can be formed in a circular plate shape, but this is only an example of the present invention and is not limited thereto.

The cell moving pipe 11 supports the cell plate 10 and can move up and down. To this end, a lower end of the cell moving pipe 11 can be connected to the cell plate 10 to fix the cell plate 10 and an upper end of the cell moving pipe 11 can be connected to the cell control unit 13 to move up and down.

In addition, an upper end of the cell plate 10 can be inserted into the guide holder 12 and connected to the cell control unit 13, and the guide holder 12 serves as a guide for a vertical movement.

That is, when the edible poultry steps on the cell plate 10, the cell moving pipe 11 is lowered. At this time, the size of the movement of the cell moving pipe 11 to the lower side depends on the weight of the edible poultry.

In addition, when the edible poultry is in the cell plate 10 and then goes down, the cell moving pipe 11 moves upward and positions in place.

The guide holder 12 guides the movement of the cell moving pipe 11 and can fix the cell moving pipe 11 so as not to be shaken.

In addition, the guide holder 12 is formed with a hole at a center, so that the cell moving pipe 11 can move up and down along the hole.

The cell control unit 13 is connected to the guide holder 12 and the cell moving pipe 11 at the lower side thereof, and the load cell is provided to measure the weight according to the downward movement of the cell moving pipe 11.

That is, the cell moving pipe 11 moves to the lower side according to the weight of the edible poultry, the load cell increases in length as it moves to the lower side, and deformation thereof occurs. The weight of the edible poultry can be measured in such a way that a deformation measurement device detects an amount of deformation as an electrical signal and converts the electrical signal into a digital signal to derive the weight as a number.

In addition, the cell control unit 13 can measure the weight of the edible poultry in the same method as described above and transmit the measured weight of the edible poultry to the weigh and shipment prediction server 2. Accordingly, the weight and shipment prediction server 2 can receive the weight of the edible poultry measured from the weight measurement device 1 and collect weight data.

In this case, the weight data represents a weight value of the edible poultry received from the weight measurement device 1.

The cell support 14 can be connected to the cell control unit 13 and fixedly installed in the poultry house.

In this case, the cell support 14 can support the cell plate 10, the cell moving pipe 11, and the guide holder 12 which are interlocked together by supporting the cell control unit 13.

In addition, the weight measurement device 1 can further include a haptic motor 15. The haptic motor 15 can be installed on the lower surface of the cell plate 10, but since it is only an example of the present invention, the haptic motor 15 can be installed at various locations to vibrate the cell plate 10.

That is, the haptic motor 15 vibrates the cell plate 10 to prevent certain edible poultry from continuously remaining on the cell plate 10 due to vibration, and thereby a large number of edible poultry can evenly step on the cell plate 10.

Such a haptic motor 15 can be controlled by the cell control unit 13 to be vibrated. For example, it can be set in such a way that the vibration is generated after the weight of the poultry is measured and can be controlled by the cell control unit 13.

In addition, the weight measurement device 1 can further include an environmental sensor provided on one side of the guide holder 12, and the environmental sensor can include one or more of a carbon dioxide measurement sensor, an ammonia measurement sensor, and a temperature and humidity sensor.

That is, in order to measure the weight, grasp the environment and the state of the edible poultry in the poultry house, control information can be monitored, related to a ventilation device (ventilation window and ventilation fan), a feed supply/water supply device, and lighting installed in the poultry house according to the state of the edible poultry, in conjunction with the monitoring unit 3, or can be controlled manually by the user.

In addition, the weight measurement device 1 can further include a feed supply unit 17.

The feed supply unit 17 is controlled by the cell control unit 13 and can automatically supply the feed every set time. That is, by supplying the feed near the weight measurement device 1 through the feed supply unit 17, the number of times the poultry steps on the weight measurement device 1 is increased by attracting the poultry to the weight measurement device 1 side.

To this end, the feed supply unit 17 can include a feed container 170, a stopper plate 173, a rotation shaft 175, and a motor 176.

The feed container 170 can be filled with feed and store the feed.

To this end, the feed container 170 can include an inlet 171 and an outlet 172.

The inlet 171 is formed on one side of the feed container 170, the feed can be injected from the outside. In addition, the inlet 171 is provided with a door capable of being opened and closed.

The outlet 172 is formed on the lower surface of the feed container 170, so that the feed inside the feed container 170 can be discharged. The outlet 172 can be opened and closed by the stopper plate 173.

The stopper plate 173 is provided below the outlet 172 of the feed container 170 to open and close the outlet 172.

To this end, the stopper plate 173 is formed in a plate shape, and a supply hole 174 penetrating the upper and lower surfaces thereof can be formed on one side.

Accordingly, the outlet 172 is blocked by the stopper plate 173 at all times, and when the feed is supplied, the stopper plate 173 is rotated so that the feed can be supplied when the positions of the outlet 172 and the supply hole 174 match each other.

The rotation shaft 175 is connected to the upper surface of the stopper plate 173 so that the stopper plate 173 can be rotated by the rotation shaft 175.

Rotational power of the rotation shaft 175 can be transmitted from the motor 176 by the rotation shaft 175 being connected to the motor 176.

The motor 176 can be provided inside the upper portion of the feed container 170 or can be provided outside to be connected to the rotation shaft 175.

In addition, the motor 176 can be provided as a bidirectional motor.

Such a feed supply unit 17 is configured such that the outlet 172 is always blocked by the stopper plate 173, and then the motor 176 is driven by the cell control unit 13 every set time interval, the stopper plate 173 is rotated and the supply hole 174 is located at the position of the outlet 172 to supply only a certain amount of the feed, and rotates again to block the outlet 172.

As illustrated in FIG. 2, the feed supply unit 17 is formed to supply the feed every hour, but this is only an example of the present invention and is exemplary, and the feed can be supplied every hour through devices having various structures.

In addition, the feed is supplied near the weight measurement device 1 to serve as an induction, but is supplied to the cell plate 10 of the weight measurement device 1 so that the poultry can step on the weight measurement device 1 at all to eat the feed.

In addition, the weight measurement device 1 can measure the weight of a large number of the poultry when the large number of the poultry step on the weight measurement device.

In addition, in a case where two or more weight measurement devices 1 are installed in one poultry house, when the weights of edible poultry are measured at the same time, the weights measured at the same time can be summed and transmitted to the weight and shipment prediction server 2.

As described above, the weight measurement device 1 is formed by reflecting the rising behavioral habits when looking at a space where edible poultry (chicken, goose, duck, pheasant, and the like) can rise, and thereby there is an advantage that the weight of the edible poultry can be measured in real time.

Accordingly, labor and time are saved, and the edible poultry will not be stressed.

Figure 3:
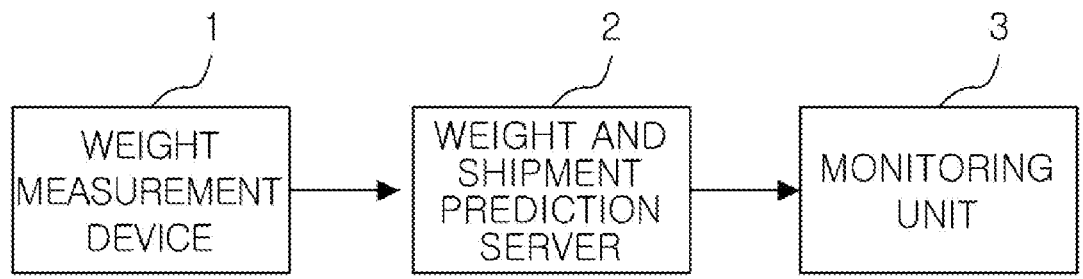
FIG. 3 is a block diagram schematically illustrating an overall configuration of the average weight calculation and shipment management system of edible poultry according to an example of the present invention.
Figure 4:
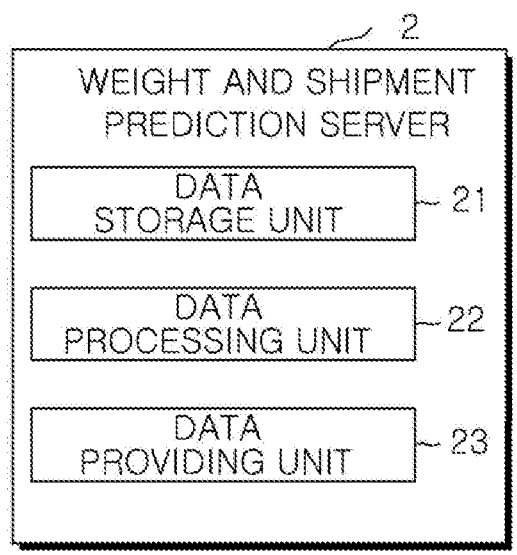
FIG. 4 is a block diagram schematically illustrating a configuration of a weight and shipment prediction server according to an example of the present invention.

Next, with reference to FIGS. 3 and 4, the weight and shipment prediction server 2 collects a large number of weight data measured by the weight measurement device 1 as described above and densifies the large number of collected weight data. Thus, it is possible to derive the average weight of the edible poultry and predict the shipping date by using the derived average weight.

To this end, the weight and shipment prediction server 2 can include a data storage unit 21 and a data processing unit 22.

The data storage unit 21 can collect and store weight data of the edible poultry received from the weight measurement device 1.

In this way, the weight of the edible poultry is measured in real time by the weight measurement device 1, and the measured weight data of the edible poultry is collected as much as possible. In addition, the data storage unit 21 can store in real time the weight data to be processed in the data processing unit 22.

The data processing unit 22 can densify the weight data stored in the data storage unit 21 to derive the average weight and predict the shipping date by using the derived average weight.

Here, the densification is based on a data density estimation theory, and the average weight can be derived by using a histogram.

That is, a large number of the weight data collected in real time for a certain period of time in the data storage unit 21 is densified in the data processing unit 22. In this case, the average weight can be derived from a plurality of weight data groups formed to be densified, and the shipping date can be predicted based on the average weight.

A detailed description of the method of deriving the average weight of the edible poultry by using densification will be described later.

Meanwhile, the weight and shipment prediction server 2 can further include a data providing unit 23 in addition to the data storage unit 21 and the data processing unit 22.

Here, the data providing unit 23 can provide the user with the weight data, the estimated average weight of the edible poultry, and the estimated shipping date from the weight and shipment prediction server 2.

In this case, the data providing unit 23 is interlocked with the monitoring unit 3 and can map a large number of poultry houses based on the predicted shipping date to provide the user with the mapped poultry houses. Therefore, the user can visually confirm whether the edible poultry in the poultry houses can be shipped at a glance.

For example, it can be mapped such that when the average weight is compared with the reference weight data, it is displayed in green if the average weight is suitable for the shipping date, it is displayed in blue if the average weight matches the reference weight data three days before the shipping date, and it is displayed in red if the average weight does not reach the reference weight data even though a time has elapsed for a long period of time from the shipping date. This allows the user to take appropriate measures.

In addition, the average weight calculation and shipment management system of the edible poultry according to an example of the present invention further includes the data providing unit 23 that receives the data for the shipment such as the weight data, the derived average weight of the edible poultry, and the shipping date predicted by the average weight from the weight and shipment prediction server 2, and provides the data to persons who are related to the edible poultry other than the operators, that is, those who receive the edible poultry when the edible poultry is shipped. Therefore, reliability can also be improved by providing the entire process until shipment.

Hereinafter, with reference to FIGS. 5 to 11, a method for calculating an average weight of the edible poultry using the average weight calculation and shipment management system of edible poultry according to an embodiment of the present invention will be described in detail.

Figure 5:
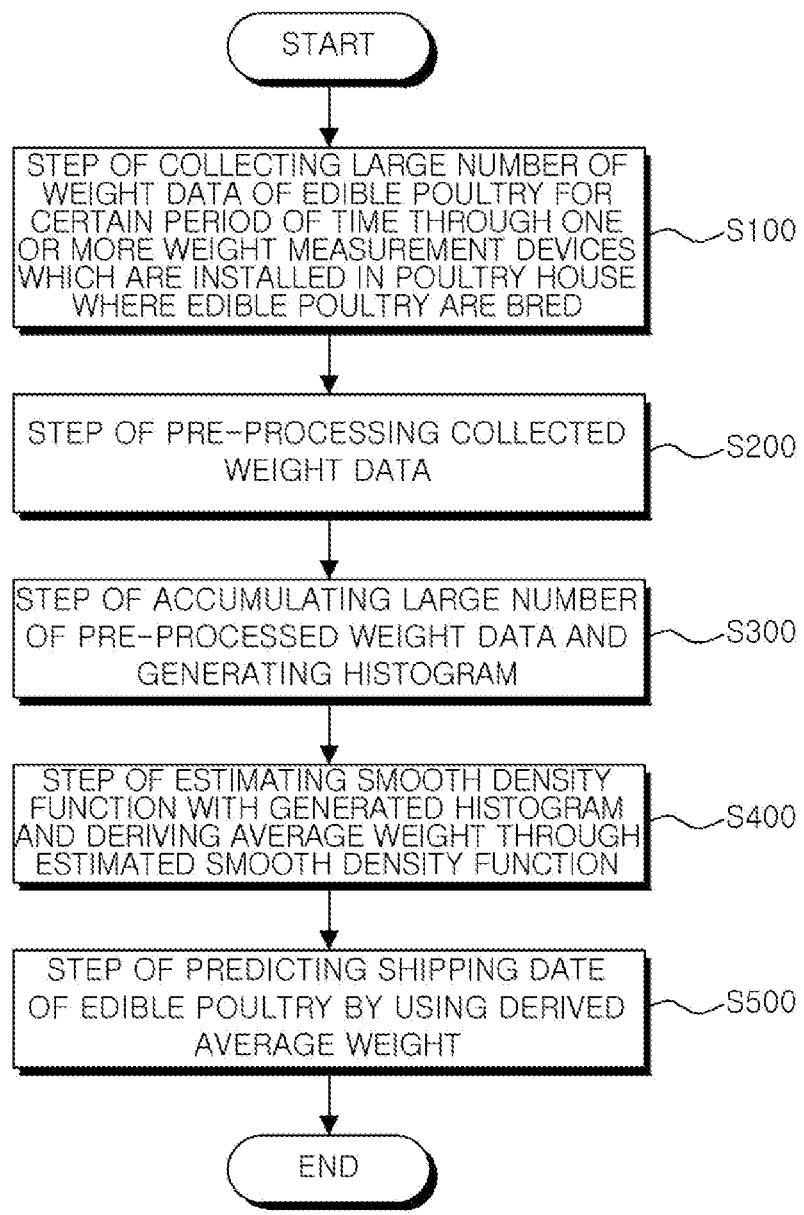
FIG. 5 is a flowchart of a shipment management method using the average weight calculation and shipment management system of edible poultry according to an example of the present invention.

First, with reference to FIG. 5, in a shipment management method using the average weight calculation and shipment management system of the edible poultry, the method can include: step (S100) of collecting a large number of weight data of the edible poultry for a certain period of time through one or more weight measurement devices 1 which are installed in the poultry house where the edible poultry are bred; step (S200) of pre-processing processing the collected weight data; step (S300) of accumulating a large number of pre-processed weight data and generating a histogram; step (S400) of estimating a smooth density function with the generated histogram, and deriving the average weight through the estimated smooth density function; and step (S500) of predicting the shipping date of the edible poultry by using the derived average weight.

Specifically, the present invention can be formed to collect a large number of weight data for a predetermined period of time through the weight measurement device 1 in order to perform step S100. This means that the weight measurement device 1 is open to allow the edible poultry to freely enter the device and to implement a haptic function, so that various edible poultry can be circulated to be a sample object, thereby collecting a lot of data. In this case, the measurement time cannot be limited, and may be measured in real time.

The step S200 is a step of pre-processing the weight data collected from the step S100, and can include step (S210) of setting an environment setting value and step (S220) of pre-processing the weight data by using the set environment setting value.

Step S210 is a step of inputting a threshold value that is an environmental setting value, that is a step of previously setting the threshold value to exclude weight data that is significantly short of the reference weight which is the threshold value derived through a large number of experiments, or to exclude weight data that significantly exceeds the reference weight.

In this case, the threshold value is obtained as a result of experiments based on the measured weight data of the edible poultry and can be set to exclude values less than 0.8 times and more than 1.3 times.

Step S220 is a step of comparing the reference weight and the measured weight data based on the threshold preset in step S210 to be pre-processed, and excluding the measured weight data that is less than 0.8 times or exceeds 1.3 times, which is the threshold value for the reference weight of each day-old, from the input weight data for generating the histogram.

Figure 6A:
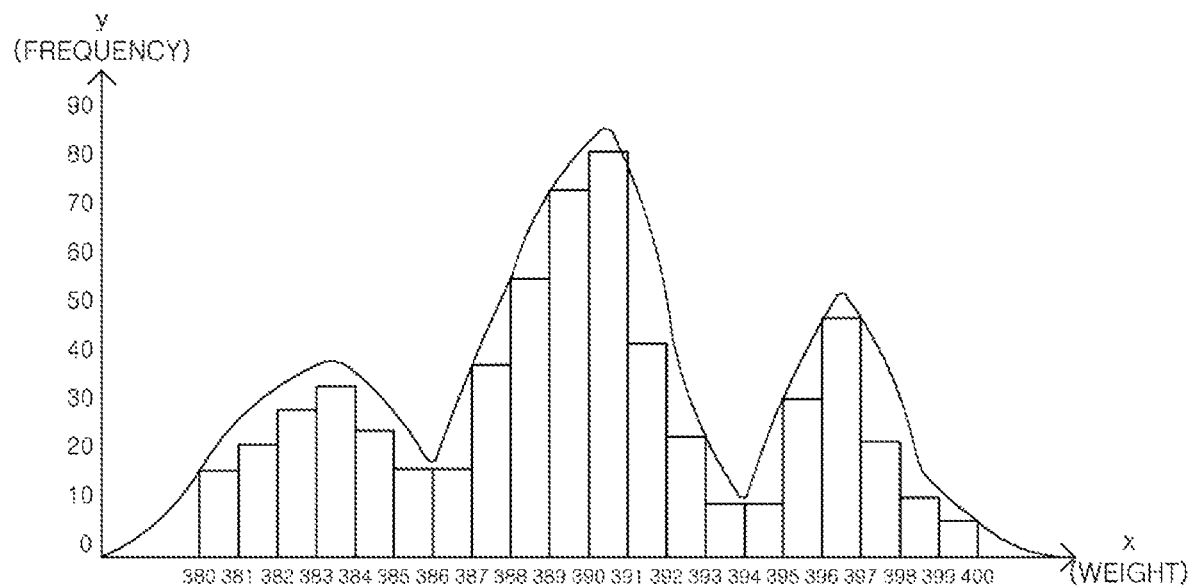
FIG. 6A is a view represented by a graph in which weight data is collected from the weight measurement device.

Step S300 is a step of accumulating a large number of pre-processed weight data to generate a histogram according to a weight and a frequency, and the y-axis of the generated histogram graph illustrated in FIG. 6a is the number of times (frequencies) the weight measurement device 1 measures, and the x-axis is the weight measured by the weight measurement device 1.

For example, as illustrated in the drawing, the histogram of the number of weight data accumulated for weights of 380 to 400 g is generated by weight data transmitted from the weight measurement device 1 of the present invention installed in the poultry house. Here, the weight data for the weight of 380 to 400 g is a pre-processed weight range of a large number of edible poultry which are accommodated in the weight measurement device 1 and of which the weight are measured.

Hereinafter, it is possible to generate the histogram by using Equation 1.

$$P_H(x) = \frac{1}{n} \times \frac{\text{Count}(x)}{\text{Width}(x)} = \frac{\text{Count}(x)}{nh} \qquad \text{[Equation 1]}$$

where, x is a weight, n is the number of collected weight data, h is a width value of a Gaussian filter, Count(x) is a frequency of x, and Width(x) is a size of a histogram bin, and h is defined as 1.

With reference to FIGS. 5 and 6, step S400 is a step of estimating a smooth density function with the generated histogram and deriving an average weight through the estimated smooth density function. S400 can be configured of step (S410) of estimating a smooth density function with the generated histogram and step (S420) of deriving the average weight through the estimated smooth density function.

Step S410 is a step of estimating the smooth density function with the generated histogram, which is a step of linearizing the histogram having a discontinuous and angular square shape so that the measured weight data is easy to grasp.

Figure 6B:
FIGS. 6B and 6C are views represented by graphs in which a densifying method of deriving an average weight by using weight data of FIG. 6A.
Figure 6C:
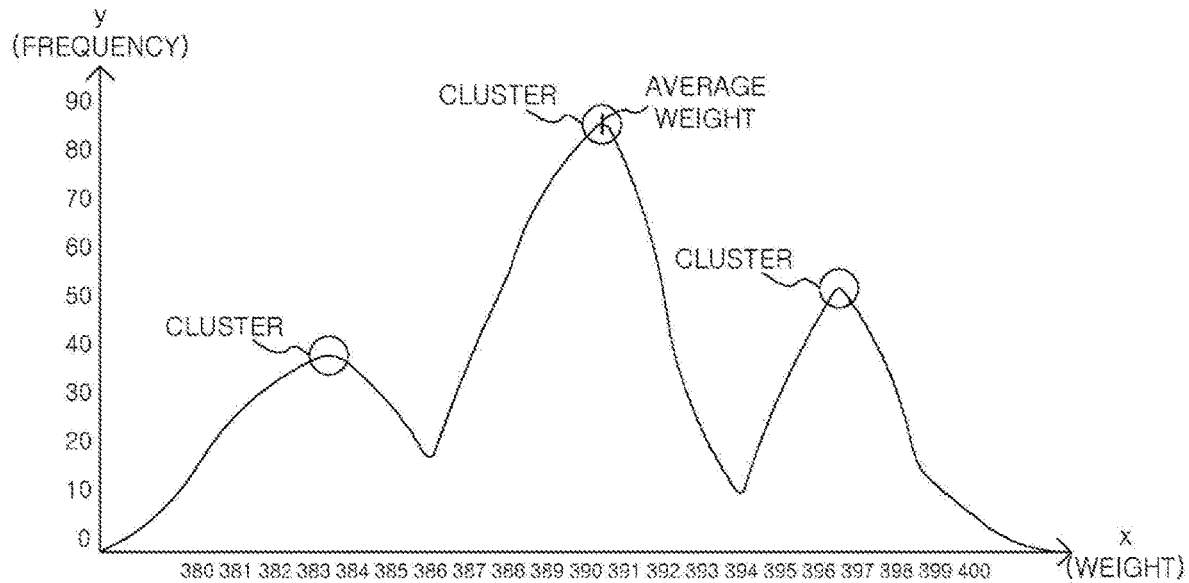
Figure 7:
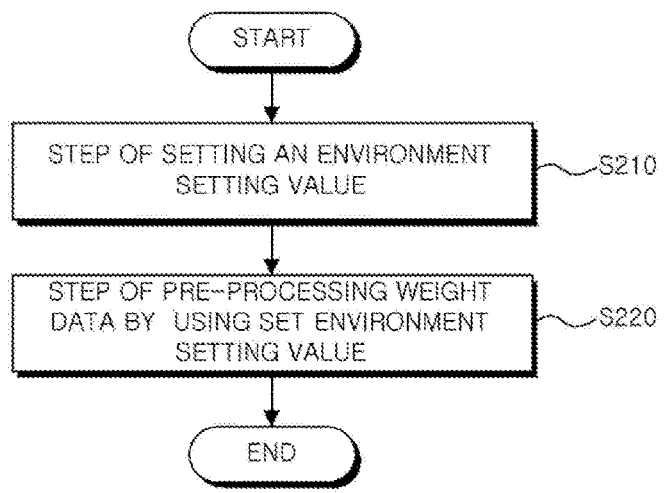
FIG. 7 is a flowchart of a process in which a step of pre-processing is performed in the shipment management method of FIG. 5.
Figure 8:
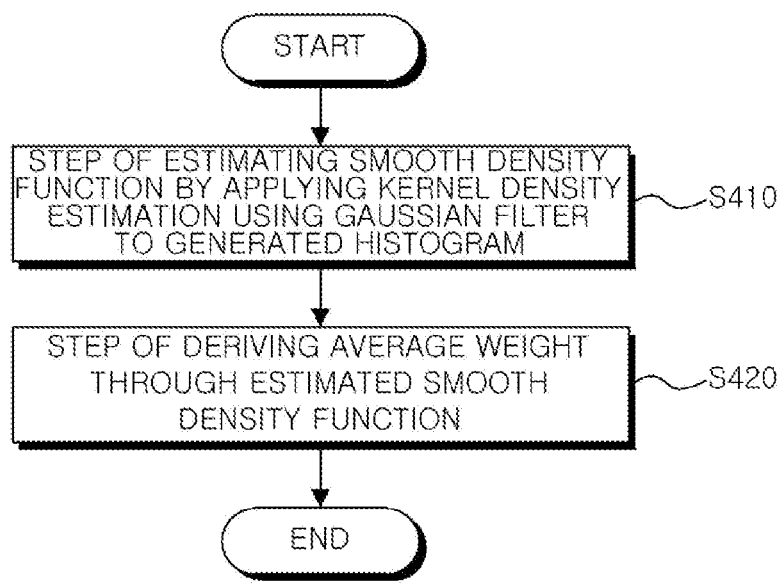
FIG. 8 is a flowchart of a process in which a step of deriving an average weight in the shipment management methods of FIG. 5 is performed.
Figure 9:
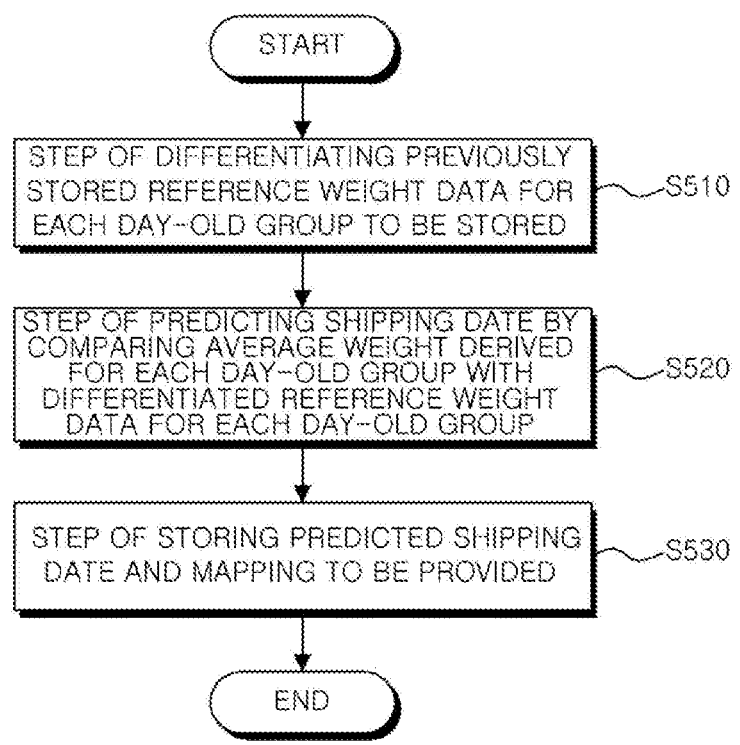
FIG. 9 is a flowchart of a process in which a step of predicting a shipping date in the shipment management method of FIG. 5 is performed.

That is, hereinafter, the smooth density function can be estimated through Equations 2 to 4, which are equations related to kernel density estimation using the Gaussian filter, and a result graph can be expressed as illustrated in FIG. 6b.

$$\int_{R^D} K(x)dx = 1 \qquad \text{[Equation 2]}$$

$$K(x) = \frac{1}{(2\pi)^{D/2}} \exp\left(-\frac{1}{2}x^T x\right) \qquad \text{[Equation 3]}$$

$$P_{KDE}(x) = \frac{1}{Nh^D} \sum_{i=1}^{N} K\left(\frac{x - x^{(i)}}{h}\right) \qquad \text{[Equation 4]}$$

$$= \frac{1}{N} \sum_{i=1}^{N} \frac{1}{\left(h\sqrt{2\pi}\right)^D} \exp\left(-\frac{1}{2}\left(\frac{x - x^{(i)}}{h}\right)^2\right)$$

The Equation 3 is a Gaussian density function, where, x is a weight, $h^D$ is an amplitude=1, $P_{KDE}(x)$ is a smooth density function estimation result using the Gaussian filter (kernel) corresponding to x, k is a Gaussian kernel function, $x-x^{(i)}$ is a filter size to which the Gaussian filter is applied from filter sizes 1 to N based on x to be calculated, D is a parameter for reflecting a size of the histogram bin in defining a width of the Gaussian filter, and N is the Gaussian filter size defined as 49.

The reason why N is defined as 49 is that the kernel size is 49 g, and the Gaussian mean of the reference x−24 to x+24 is calculated to calculate the $P_{KDE}(x)$ of x.

At this time, in the case of the smooth kernel estimation, it can be regarded as a sum of soft bumps placed on the observation point (weight in x-axis), and the estimated smooth density function determines a rising shape, and $h^D$ is called amplitude and determines the width.

The above-described amplitude determines an overall shape of the graph and can be important for the estimation of the smooth density function.

Step S420 is a step of deriving the average weight through the estimated smooth density function, and in which when a weight with high frequency is called a cluster, among a large number of weights having the highest frequency (density) in the smooth density function estimation graph (FIG. 6b), a cluster (highest portion) of the edible poultry with the highest frequency among the clusters (rising portions) is selected, and the maximum value of the selected cluster (FIG. 6c) is the average weight of the edible poultry which are bred in the poultry house.

The average weight can be derived daily through the steps S100 to S400 for each day-old group and can be stored in the data storage unit 21 to be recorded.

The step S400 can be the same as the role of the data processing unit 22 described above.

Step S500 is a step of predicting the shipping date of the edible poultry by using the derived average weight, and compares the average weight derived for each day-old group with the reference weight data for each day-old group previously stored in the data storage unit 21 to predict the shipping date. Here, the previously input reference weight data for each day-old group can be represented as data in a form of a 3D function graph in which start and end of the day-old are determined according to a certain day-old (for each day-old group) as the reference weight data is given for each day-old group.

Specifically, step (S510) of storing the previously stored reference weight data for each day-old group, step (S520) of predicting the shipping date by comparing the average weight derived for each day-old group with the differentiated reference weight data for each day-old group, and step (S530) of storing the predicted shipping date and mapping to be provided can be configured.

Figure 10A:
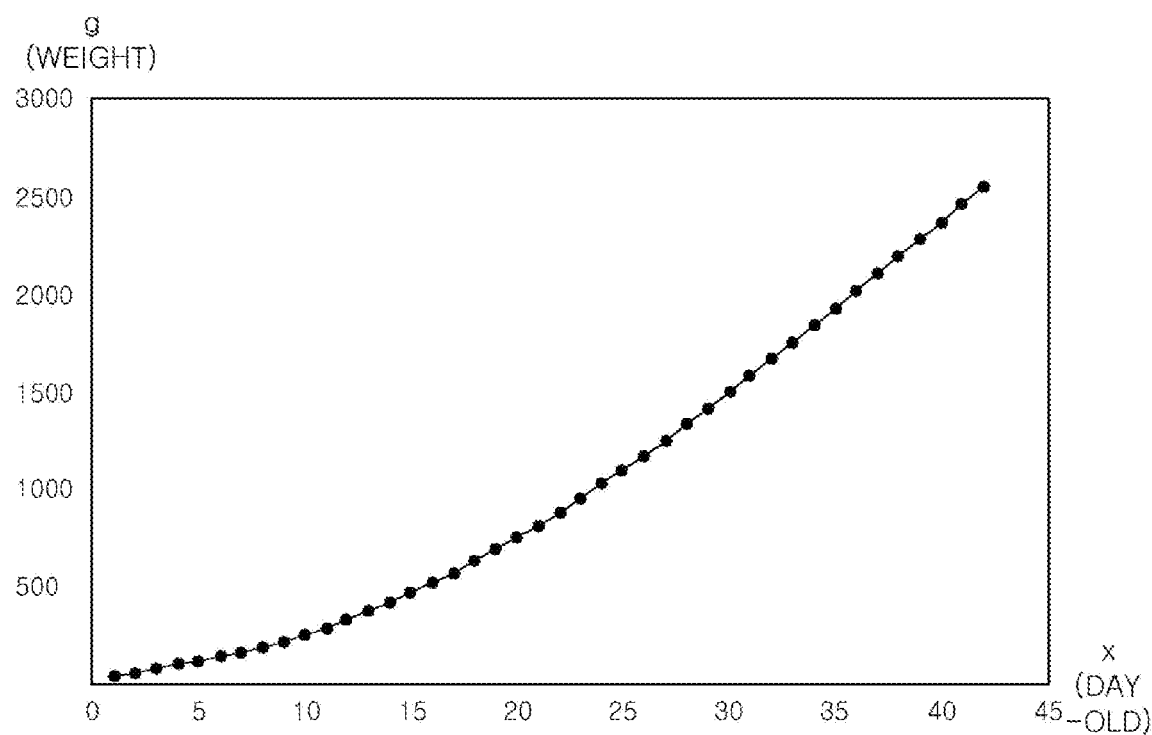
FIG. 10A is a graph of reference weight data and FIG. 10B is a graph in which the reference weight data of FIG. 10A is differentiated.
Figure 10B:
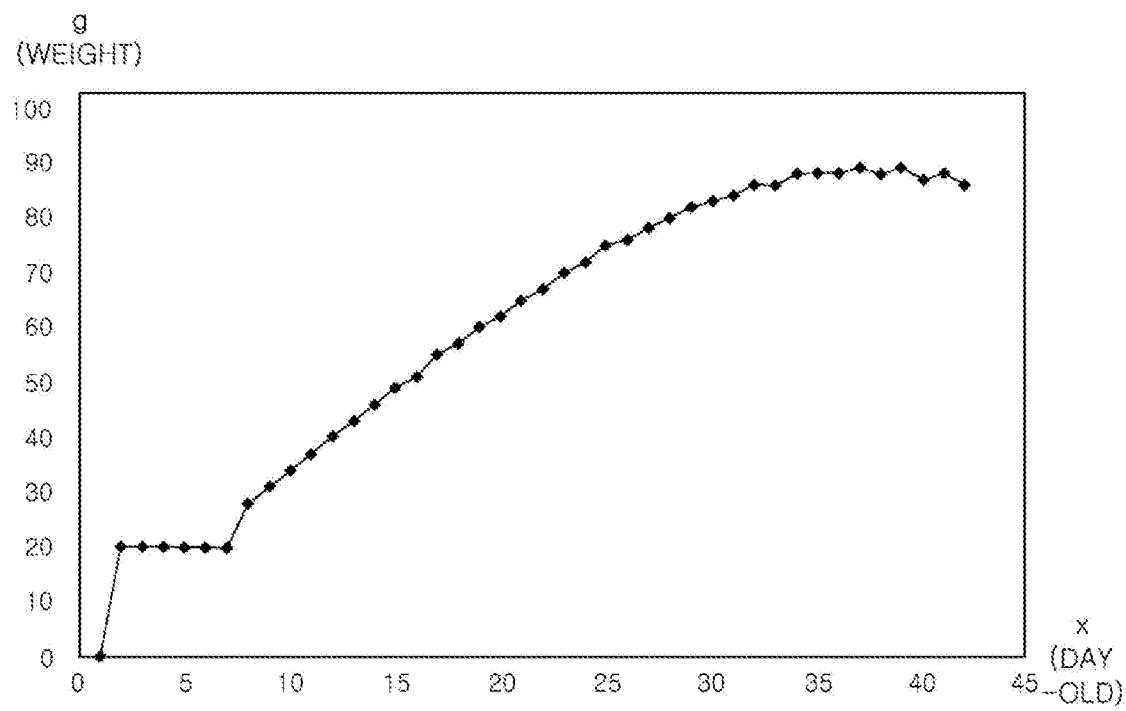

Step S510 is a step of differentiating the previously stored reference weight data for each day-old group as illustrated in FIG. 10a to be stored and can be illustrated as a graph illustrated in FIG. 10b.

In this case, the x-axis of FIG. 10b represents the day-old, and the y-axis represents the differential value (weight=g).

In detail, the y-axis represents the reference weight that increases as each day-old passes, which means that a value for 15-day-old must be increased by up to 49 g compared to 14-day-old.

Step S520 is a step of predicting the shipping date by comparing the derived average weight for each day-old group with the differentiated reference weight data for each day-old group.

For example, when the edible poultry bred in the poultry house is 14-day-old, if the average weight is 419 g, it can be predicted that the edible poultry should be 458 g increased by 49 g through the differentiated reference weight data, when the edible poultry is 15-day-old. As described above, it is possible to predict when the weight of the edible poultry in the poultry house for a certain period of time in a certain period in the future can be predicted for each day-old group. Therefore, it can be known when the edible poultry have the weight suitable for the shipment.

In this case, it is desirable to compare the expected average weight from 15-day-old onward, and it can be desirable to predict the shipping date by deriving the expected average weight of the next 3 days before shipment based on the current day-old.

In addition, when the average weight measured for each day-old group is compared with the expected average weight derived by comparing with the reference weight data, if an error is wide, the environment in the poultry house can be adjusted to an optimal state.

Figure 11:
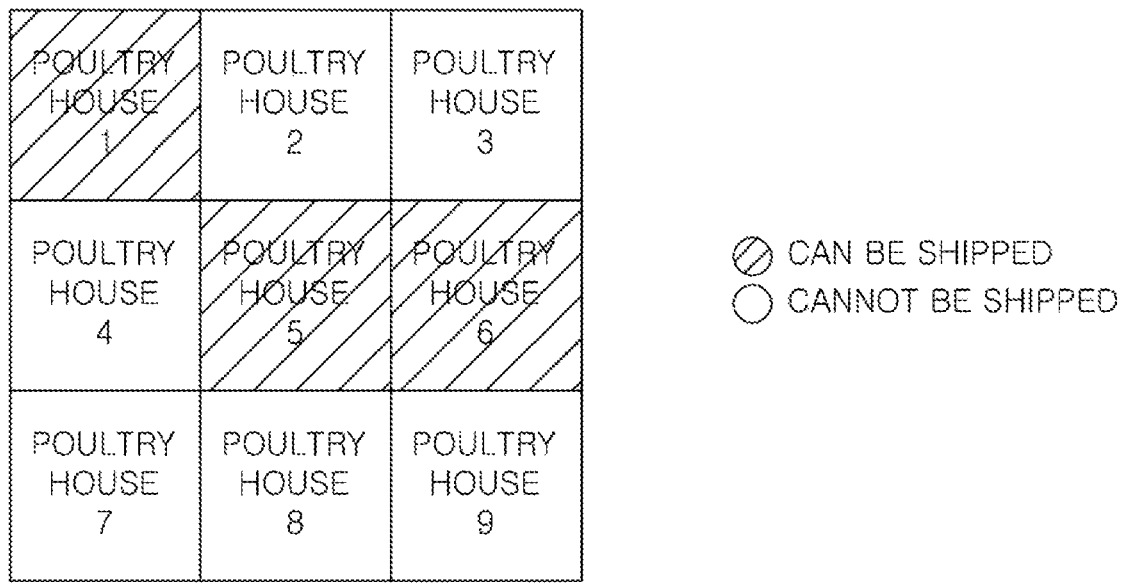
FIG. 11 is an exemplary view in which whether or not shipment of poultry in poultry houses mapped based on the shipping date is performed.

Step S530 is a step of providing the predicted shipping date by storing and mapping as illustrated in FIG. 11, in which a large number of poultry houses are mapped and provided to the user based on the predicted shipping date, and also stored.

Since step S530 is the same as the role of the data providing unit 23 described above, a detailed description will be omitted.

In the average weight measurement system of edible poultry according to the example of the present invention described above and the shipment management according to the measurement, the weight of the edible poultry can be measured in real time.

In addition, the shipping date can be managed by monitoring the status of the edible poultry.

In addition, a good breeding environment for the edible poultry can be provided by controlling and monitoring the environment of the poultry house.

In addition, there is an advantage that the present invention can be applied to all poultry, thereby being widely used in breeding systems.

In addition, a poultry growth manual can be prepared through big data of the bio-information of poultry and environmental information.

In addition, edible poultry having high-quality can be shipped, thereby providing the consumer with a product having high commerciality.

In addition, the cost of loss, labor and feed costs can be reduced.

The examples of the present invention are described above with reference to the accompanying drawings, but it will be appreciated that those skilled in the art to which the present invention pertains can be implemented in other specific forms without changing the technical spirit or essential features of the present invention. Therefore, the above-described examples are illustrative in all respects and are not limiting.

The invention claimed is:

1. A system for calculating an average weight of poultry and managing shipment of the poultry, the system comprising:
   a weight measurement device installed in a poultry house and configured to measure a weight of the poultry, wherein the weight measurement device comprises a cell plate configured to accommodate the poultry and a cell moving pipe configured to support the cell plate and to move up and down;
   a weight and shipment prediction server configured to receive a plurality of weight data measured in real time from the weight measurement device, pre-process the plurality of weight data, generate a histogram according to a plurality of pre-processed weight data and a frequency, densify the plurality of pre-processed weight data to derive the average weight of the poultry, and predict a shipping date by using the average weight of the poultry; and
   a monitoring unit configured to receive the average weight of the poultry and the shipping date from the weight and shipment prediction server,
   wherein the weight and shipment prediction server is configured to:
      derive the average weight of the poultry by applying a kernel density estimation using a Gaussian filter to the histogram to estimate a smooth density function having a plurality of clusters;
      select a highest-frequency cluster among the plurality of clusters and select a maximum value of the highest-frequency cluster as the average weight of the poultry;
      generate the histogram by using Equation 1:

$$P_H(x) = \frac{1}{n} \times \frac{\text{Count}(x)}{\text{Width}(x)} = \frac{\text{Count}(x)}{nh} \quad \text{[Equation 1]}$$

where, x denotes a weight in the plurality of pre-processed weight data, n denotes a number of the plurality of pre-processed weight data, h denotes a width value of the Gaussian filter, Count(x) denotes a frequency of x, and Width(x) denotes a size of a histogram bin, and
   wherein the weight and shipment prediction server is further configured to:
      estimate the smooth density function having the plurality of clusters by using $$P_{KDE}(x) = \frac{1}{Nh^D} \sum_{i=1}^{N} K\left(\frac{x - x^{(i)}}{h}\right) \quad \text{[Equation 2]}$$

$$= \frac{1}{N} \sum_{i=1}^{N} \frac{1}{(h\sqrt{2\pi})^D} \exp\left(-\frac{1}{2}\left(\frac{x - x^{(i)}}{h}\right)^2\right)$$

where, x denotes the weight in the plurality of pre-processed weight data, h" denotes an amplitude=1, $P_{KDE}(x)$ denotes a smooth density function estimation result using a Gaussian filter (kernel) corresponding to x, k denotes a Gaussian kernel function, $x-x^{(i)}$ denotes a filter size to which the Gaussian filter is applied from filter sizes 1 to N based on x to be calculated, D denotes a parameter for reflecting the size of the histogram bin in defining the width value of the Gaussian filter, and N denotes a Gaussian filter size defined as 49.

2. The system of claim 1, wherein the weight measurement device further comprises:
   a guide holder configured to guide a movement of the cell moving pipe;
   a cell control unit connected to the guide holder and the cell moving pipe, and having a load cell to measure the weight of the poultry according to a downward movement of the cell moving pipe; and
   a cell support connected to the cell control unit and fixed to an inside of the poultry house, and configured to support the cell plate, the cell moving pipe, the guide holder, and the cell control unit.

3. The system of claim 2,
   wherein the weight measurement device further comprises a haptic motor disposed on a lower surface of the cell plate, and
   wherein the haptic motor is configured to prevent one of the poultry accommodated in the cell plate from continuously remaining thereon by vibration of the haptic motor and thereby increase a number of times that other of the poultry step on the weight measurement device.

4. The system of claim 2,
   wherein the weight measurement device further comprises an environment sensor disposed on one side of the guide holder, and
   wherein the environment sensor includes one or more of a temperature and humidity sensor, a carbon dioxide sensor, or an ammonia sensor, or a combination thereof.

5. The system of claim 1, wherein the weight and shipment prediction server comprises:
   a data storage unit configured to collect and store the plurality of weight data transmitted from the weight measurement device; and
   a data processing unit configured to densify the plurality of weight data stored in the data storage unit to derive the average weight of the poultry and to predict the shipping date by using the average weight of the poultry.

6. The system of claim 5,
   wherein the data processing unit is further configured to predict the shipping date by deriving an expected average weight for a predetermined period of time in a future based on a differential weight value obtained by differentiating a previously inputted reference weight data for a day-old group of the poultry with another previously inputted reference weight data for another day-old group of the poultry, and
   wherein a plurality of previously inputted reference weight data for day-old groups is data in a form of a third-order function graph for a reference weight according to a day-old, wherein the predetermined period of time starts from day 15.

7. The system of claim 1, further comprising:
a data providing unit configured to provide a user with the plurality of weight data, an estimated average weight, and a predicted shipping date of the poultry from the weight and shipment prediction server,
wherein the data providing unit is further configured to map a plurality of poultry houses based on the predicted shipping date and provide the user with mapped poultry houses.

8. A shipment management method using a system for calculating an average weight of poultry and managing shipment of the poultry, the method comprising:
collecting a plurality of weight data of the poultry for a predetermined period of time through one or more weight measurement devices installed in a poultry house,
wherein the one or more weight measurement devices include a weight and shipment prediction server;
increasing a number of times that the poultry step on the one or more weight measurement devices by a haptic motor and a feed supply unit;
pre-processing the plurality of weight data by the weight and shipment prediction server;
accumulating a plurality of pre-processed weight data and generating a histogram according to the plurality of pre-processed weight data and a frequency;
estimating a smooth density function with the histogram by the weight and shipment prediction server, and deriving the average weight of the poultry through the smooth density function,
wherein the deriving the average weight of the poultry comprises applying a kernel density estimation using a Gaussian filter to the histogram to estimate a smooth density function having a plurality of clusters,
selecting a highest-frequency cluster among the plurality of clusters and selecting a maximum value of the highest-frequency cluster as the average weight of the poultry; and
predicting a shipping date of the poultry by using the average weight of the poultry derived by the weight and shipment prediction server,
wherein the histogram is generated by using Equation 1:

$$P_H(x) = \frac{1}{n} \times \frac{Count(x)}{Width(x)} = \frac{Count(x)}{nh},$$ [Equation 1]

where, x denotes a weight in the plurality of pre-processed weight data, n denotes a number of the plurality of pre-processed weight data, h denotes a width value of the Gaussian filter, Count(x) denotes a frequency of x, and Width(x) denotes a size of a histogram bin, and
wherein the smooth density function is estimated by using Equation 2:

$$P_{KDE}(x) = \frac{1}{Nh^D} \sum_{i=1}^{N} K\left(\frac{x-x^{(i)}}{h}\right)$$ [Equation 2]

$$= \frac{1}{N} \sum_{i=1}^{N} \frac{1}{(h\sqrt{2\pi})^D} \exp\left(-\frac{1}{2}\left(\frac{x-x^{(i)}}{h}\right)^2\right)$$

where, x denotes the weight in the plurality of pre-processed weight data, h" denotes an amplitude=1, $P_{KDE}(X)$ denotes a smooth density function estimation result using a Gaussian filter (kernel) corresponding to x, k denotes a Gaussian kernel function, $x-x^{(i)}$ denotes a filter size to which the Gaussian filter is applied from filter sizes 1 to N based on x to be calculated, D denotes a parameter for reflecting the size of the histogram bin in defining the width value of the Gaussian filter, and N denotes a Gaussian filter size defined as 49.

9. The method of claim 8, wherein the pre-processing the plurality of weight data comprises:
setting a threshold value based on an experiment of previously acquired weight data of the poultry; and
excluding weight data that are less than 0.8 times the threshold value or more than 1.3 times the threshold value.

10. The method of claim 8,
wherein the predicting the shipping date of the poultry comprises predicting the shipping date by deriving an expected average weight for a predetermined period of time in a future based on a differential weight value obtained by differentiating a previously inputted reference weight data for a day-old group of the poultry with another previously inputted reference weight data for another day-old group, and
wherein a plurality of previously inputted reference weight data for day-old groups is data in a form of a third-order function graph for a reference weight according to a day-old,
wherein the predetermined period of time starts from day 15.

11. The system of claim 1,
wherein the weight and shipment prediction server is configured to pre-process the plurality of weight data by setting a threshold value based on an experiment of previously acquired weight data of the poultry to exclude weight data that are less than 0.8 times the threshold value or more than 1.3 times the threshold value.

12. The system of claim 2,
wherein the weight measurement device further comprises a feed supply unit configured to automatically supply feed every predetermined time to increase a number of times that the poultry step on the weight measurement device.

* * * * *